(12) United States Patent
Lai

(10) Patent No.: US 7,289,242 B2
(45) Date of Patent: Oct. 30, 2007

(54) IMAGE SCANNER HAVING MULTIPLE SCANNING WINDOWS

(76) Inventor: Jiunn-Yiing Lai, 3 Fl., No. 23, Huchian St., Shijr City, Taipei (TW) 221

( * ) Notice: Subject to any disclaimer, the term of this patent is extended or adjusted under 35 U.S.C. 154(b) by 919 days.

(21) Appl. No.: 10/188,935

(22) Filed: Jul. 3, 2002

(65) Prior Publication Data

US 2003/0117671 A1 Jun. 26, 2003

(30) Foreign Application Priority Data

Dec. 25, 2001 (TW) .............................. 90132196 A

(51) Int. Cl.
*H04N 1/203* (2006.01)
*H04N 1/04* (2006.01)
*H04N 1/047* (2006.01)
*H04N 1/10* (2006.01)
*H04N 1/195* (2006.01)
*H04N 1/40* (2006.01)

(52) U.S. Cl. ....................... 358/1.6; 358/408; 358/450; 358/474; 358/488; 358/497

(58) Field of Classification Search ................. 358/1.6, 358/1.18, 408, 450, 471, 474, 494, 497, 483, 358/488, 505, 514
See application file for complete search history.

(56) References Cited

U.S. PATENT DOCUMENTS

| 4,641,199 A | * | 2/1987 | Miyagi | ....................... 358/483 |
| 5,532,845 A | * | 7/1996 | Gusmano | .................... 358/474 |
| 6,228,125 B1 | * | 5/2001 | Kuriyama | .................. 382/304 |

* cited by examiner

*Primary Examiner*—Scott A. Rogers
(74) *Attorney, Agent, or Firm*—Berkeley law & Technology Group, LLP

(57) ABSTRACT

An image scanner for converting image data of multiple scanning lines of a scanned object into digital data comprises a first image-receiving end moving in a scanning direction for receiving image data of a first portion of the scanned object, a second image-receiving end disposed downstream of the first image-receiving end in the scanning direction and moving along the scanning direction for receiving image data of a second portion of the scanned object. The scanner further comprises a first photoelectric conversion device synchronously moving with the first image-receiving end for converting the image data of the first portion of the scanned object to a first digital data, and a second photoelectric conversion device synchronously moving with the second image-receiving end for converting the image data of the second portion of the scanned object to a second digital data, wherein the second digital data is combined with the first digital data.

18 Claims, 9 Drawing Sheets

IMAGE SCANNER HAVING MULTIPLE SCANNING WINDOWS

FIELD OF THE INVENTION

The present invention relates to an image scanner, and more particularly to image scanner having multiple scanning windows.

BACKGROUND OF THE INVENTION

Please refer to FIG. 1A which schematically shows a conventional flatbed image scanner. Generally, the image scanner 1 includes a cover (not shown) and a lower housing 10 in which a carriage module 11, a carriage-driving mechanism 12 and a circuit board 13 are disposed. The carriage module 11 is carried by a motor and gear set 121 of the carriage-driving mechanism 12 to pass under a transparent scanning platform 15 along a track 122 for proceeding a reflective or penetrative scanning for a document/picture or a film placed on the transparent scanning platform 15. When scanning, the carriage module 11 will keep electrically connecting to the circuit board 13 via a flat flexible cable (FFC) (not shown) for transmitting signals. Furthermore, when the carriage module 11 including an image pickup device moves in a scanning direction A, an image data of the scanned document is transmitted to the image pickup device via a scanning window of the carriage module 11 to be converted into a digital data. Then, the digital data is transmitted to a personal computer 3 via a transmission interface, e.g. a universal serial bus (USB) 1.1, to be further processed.

Please refer to FIG. 1B which is a diagram illustrating the carriage of the flatbed image scanner shown in FIG. 1A. For avoiding too complicated figure while describing the optical path clearly, the carriage module 11 is not proportionally enlarged herein and both the scanning platform and the scanned object are merely represented by a straight line 15. For example, a reflective scanner employs a charged-coupled device (CCD) as the image pickup device. When scanning, a light emitted from a light source 111 is reflected by the scanned document on the transparent scanning platform 15 and passes through a scanning window 115 to enter the carriage module 11. In the carriage module 11, after being reflected by a set of reflective mirrors 112 and passing through a lens 113, the light is focused on the CCD 114 for proceeding the photoelectric signal conversion. Along with the movement of the carriage module 11, the light source 111 illuminates on each of the scanning lines of the scanned document for obtaining the image data of each scanning line. In other words, when the scanning window 115 moves along with the carriage module 11 from the scanning start line B, e.g. the front end of the scanning platform 15, to the scanning end line C, e.g. the rear end of the scanning platform 15, it is necessary to have an extra space 16 at the rear end of scanning platform for accommodating optical devices 112 and 113 and the CCD 114. On the contrary, if the scanning window 115 is disposed at the rear end of the carriage module 11 as shown in FIG. 1C instead of the front end shown in FIG. 1B, an extra space 17 is also required at the front end of scanning platform for accommodating those optical devices 112 and 113 and the CCD 114. Hence, the rest area occupied by the scanner machine is redundantly larger than that required for practically scanning. Therefore, it is space-inefficient and deviating from the mini-size requirement of current computer peripheral equipment.

In addition, during the scanning period, it is necessary for the scanning window 115 of the carriage module 11 to gradually move from the scanning start line B to the scanning end line C, and transmit the realized image data into the personal computer via the transmission interface line by line to complete the entire image data of the scanned document. Therefore, the scanning speed is limited.

Therefore, the purpose of the present invention is to develop an image scanner having multiple scanning windows to deal with the above situations encountered in the prior art.

SUMMARY OF THE INVENTION

An object of the present invention is to provide an image scanner having multiple scanning windows for efficiently reducing scanning time.

Another object of the present invention is to provide an image scanner having multiple scanning windows for reducing the space-consumption.

According to an aspect of the present invention, there is provided an image scanner for converting image data of multiple scanning lines of a scanned object into digital data, respectively. The image scanner includes a scanning platform for placing a scanned object thereon, a first image-receiving end moving in a scanning direction to pass through the scanning platform for receiving image data of a first portion of the scanned object, a second image-receiving end disposed downstream of the first image-receiving end in the scanning direction, separate from the first image-receiving end by a distance, and moving along the scanning direction for receiving image data of a second portion of the scanned object, a first photoelectric conversion device synchronously moving with the first image-receiving end for converting the image data of the first portion of the scanned object to a first digital data, and a second photoelectric conversion device synchronously moving with the second image-receiving end for converting the image data of the second portion of the scanned object to a second digital data, wherein the second digital data is combined with the first digital data in order to obtain a digital image data of the scanned object.

Preferably, the first and second image-receiving ends and the first and second photoelectric conversion devices are disposed in a single carriage module to be synchronously moved. The single carriage module preferably includes a first scanning window and a second scanning window to serve as the first image-receiving end and the second image-receiving end for respectively receiving two scanning lines on the scanning platform. The first and second scanning windows are preferably disposed at two opposite ends of the single carriage module, respectively.

Preferably, the first image-receiving end and the first photoelectric conversion device are disposed in a first carriage module, the second image-receiving end and the second photoelectric conversion device are disposed in a second carriage module, and the first and second carriage modules respectively have a first and a second scanning windows to serve as the first image-receiving end and the second image-receiving end for respectively receiving two scanning lines on the scanning platform.

Desirably, the first and second carriage modules synchronously move in the scanning direction. In addition, the image scanner include a driving device for simultaneously carrying the first and second carriage modules to move in the scanning direction.

Preferably, the first and second scanning windows are disposed at distant ends of the first and second carriage modules, respectively.

Preferably, the distance between the first image-receiving end and the second image-receiving end is not larger than a half of the scanning platform in length.

For example, the first and second photoelectric conversion devices can be charge-coupled devices (CCD).

For example, the first and second photoelectric conversion devices can be combined into one charge-coupled device (CCD).

For example, the first and second photoelectric conversion devices can be contact image sensors (CIS).

According to another aspect of the present invention, there is provided an image scanner for converting image data of multiple scanning lines of a scanned object into digital data, respectively. The image scanner includes a scanning platform for placing a scanned object thereon, a carriage case having a plurality of scanning windows which respectively correspond to positions of the multiple scanning lines on the scanning platform when moving in a scanning direction, and a photoelectric conversion device disposed inside the carriage case and moving with the carriage case in the scanning direction for receiving image data of the multiple scanning lines through the plural scanning windows, respectively, and converting the image data to digital data.

Preferably, the carriage case includes two scanning windows disposed at two ends of the carriage case, respectively, and facing the scanning platform. The distance between the two scanning windows is preferably not larger than a half of the scanning platform in length.

In an embodiment, the carriage case is a single case.

In another embodiment, the carriage case includes two separated portions synchronously moving in the scanning direction, and each of the separated portions has at least one scanning window. The distance between the two separated portions is preferably not larger than a half of the scanning platform in length.

For example, the photoelectric conversion device can include a plurality of contact image sensors (CIS) for respectively receiving the image data of the multiple scanning lines and converting the image data to the digital data.

For example, the photoelectric conversion device can include a plurality of charge-coupled devices (CCD) for respectively receiving the image data of the multiple scanning lines and converting the image data to the digital data.

According to a further aspect of the present invention, there is provided an image scanner for converting image data of multiple scanning lines of a scanned object to digital data. The image scanner includes a scanning platform for placing a scanned object thereon, a carriage case having two scanning windows respectively corresponding to positions of the multiple scanning lines on the scanning platform when moving in a scanning direction, and a photoelectric conversion device disposed inside the carriage case and moving with the carriage case in the scanning direction for receiving image data of the multiple scanning lines through the two scanning windows, respectively, and converting the image data to digital data.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2:
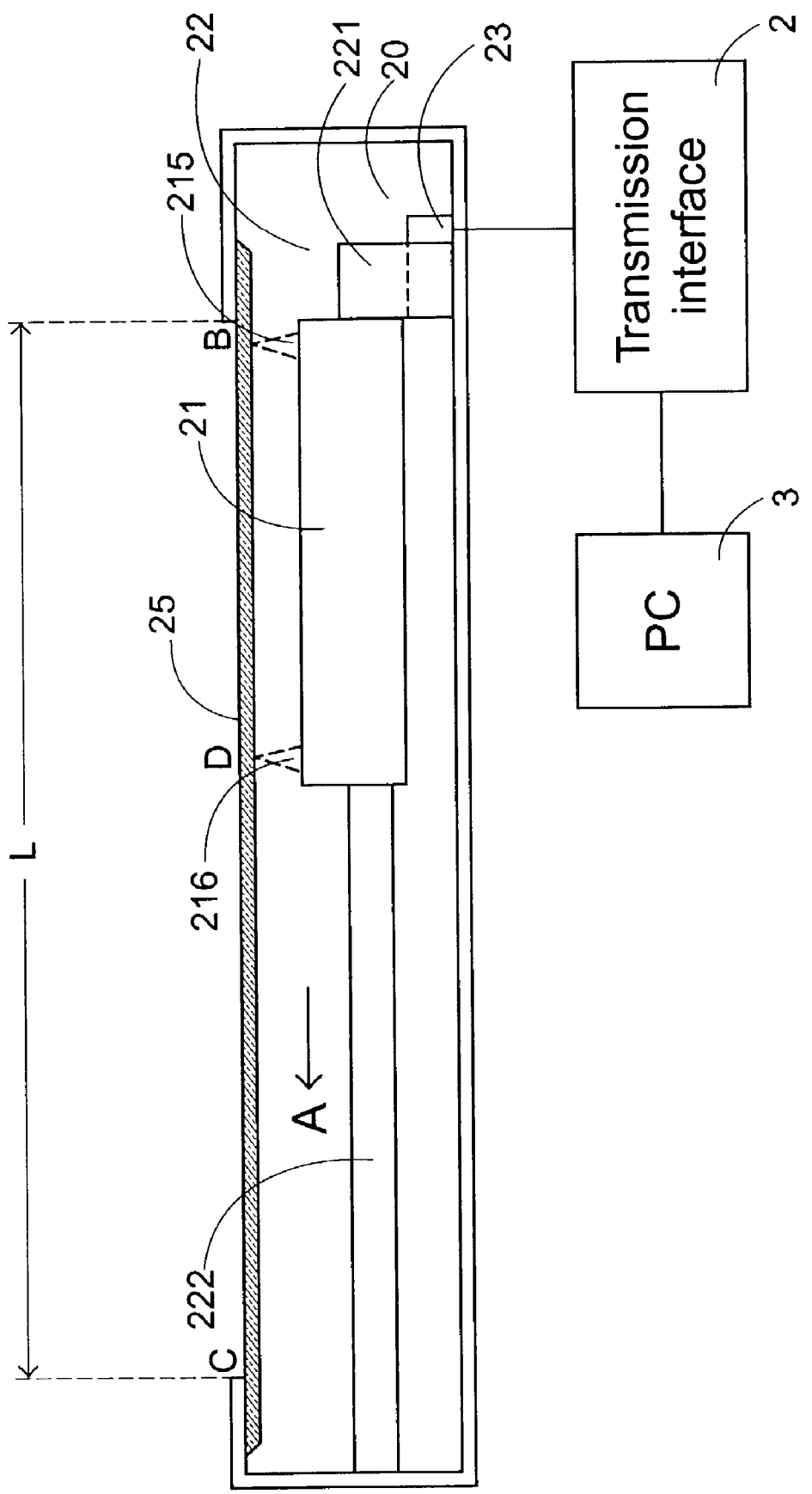
FIG. 2 is a lateral cross-sectional view illustrating a preferred embodiment of an image scanner according to the present invention wherein the image scanner includes an elongated carrier module.
Figure 3A:
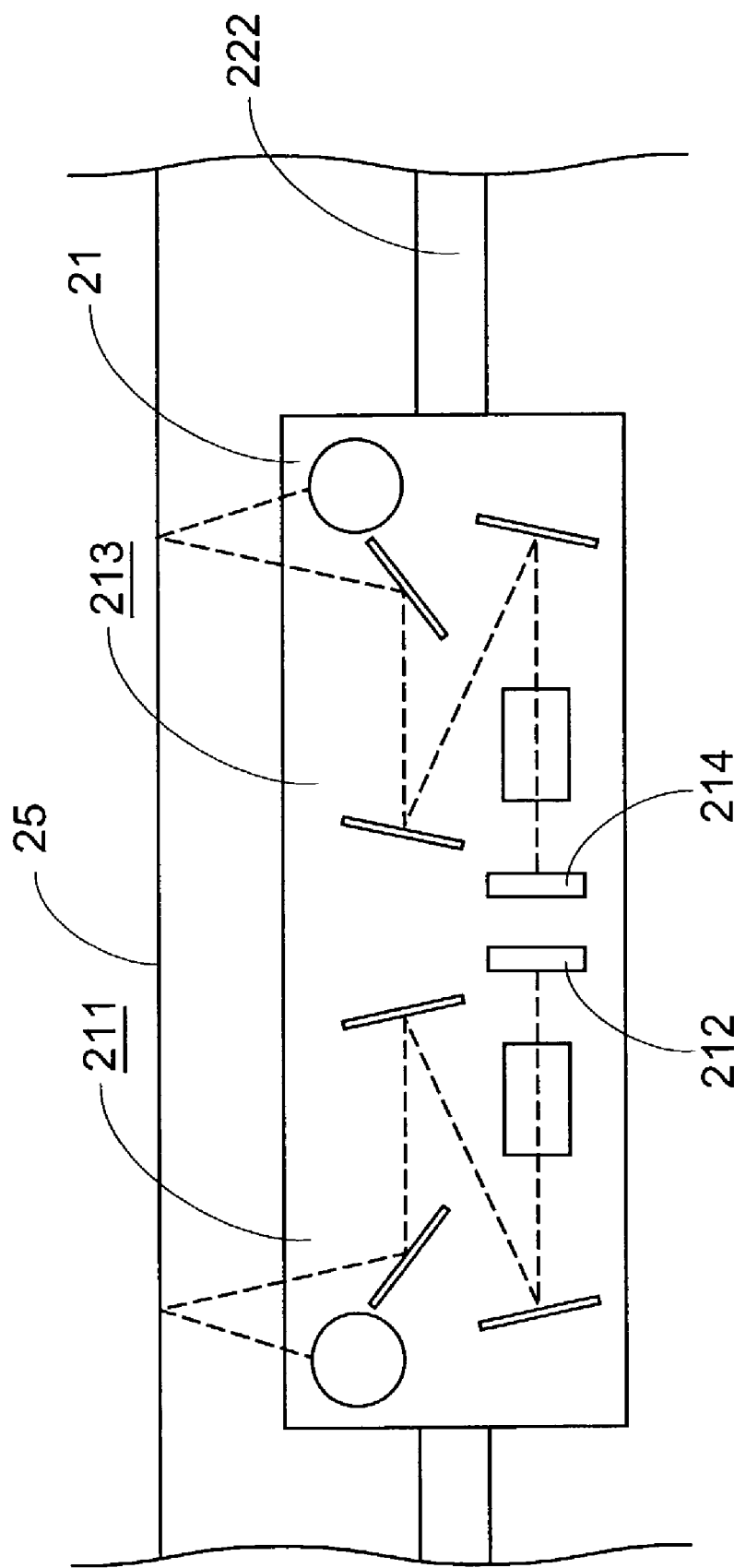
FIG. 3A is a schematic diagram illustrating a preferred embodiment of a carriage module of the image scanner in FIG. 2.

Please refer to FIG. 2, which schematically shows a preferred embodiment of an image scanner according to the present invention. The image scanner includes a cover (not shown) and a lower housing 20 in which a carriage module 21, a carriage-driving mechanism 22 and a circuit board 23 are disposed. The carriage module 21 is carried by a motor and gear set 221 of the carriage-driving mechanism 22 to pass under a transparent scanning platform 25 along a track 222 for proceeding a reflective or penetrative scanning operation for a document/picture or a film placed on the transparent scanning platform 25. In this embodiment, there are two sets of optical devices 211, 213 and CCD 212, 214 disposed inside the carriage module 21 as shown in FIG. 3A. In addition, the carriage module 21 includes two scanning windows 215 and 216 corresponding to those two sets of optical devices 211, 213 and CCD 212, 214, respectively, and disposed at two opposite ends of the carriage module 21. The distance between two scanning windows 215 and 216 is about but not larger than a half of the scanning platform 25 in length. When scanning, the first scanning window 215 serving as a first image-receiving end moves from the front end B toward the middle D of the scanning platform 25 in a scanning direction A, and simultaneously the second scanning window 216 serving as a second-receiving end moves from the middle D toward the rear end C of the scanning platform 25 in the scanning direction A. When the second scanning window 216 reaches the rear end C of the scanning platform 25, the scanning operation is finished. In other words, for scanning an object of a size approximating the entire scanning platform 25, the carrier module 21 has only to travel a half of distance compared to the prior art. Thus, the scanning time can almost be reduced to a half. Furthermore, for assuring of the scanning result without missing out any scanning line, the scanning data realized by the two scanning windows 215 and 216 preferably have an overlapped portion. That is, when the second scanning window 216 reaches the rear end C of the scanning platform 25, the first scanning window 215 preferably just passes the scanning start point D of the second scanning window 216.

Sequentially, these two sets of digital data resulting from the scanning operations respectively performed by the first and second scanning windows 215 and 216 are further integrated by the software to obtain a complete digital data of the scanned object. In addition, for speeding to transmit these two sets of digital data to a personal computer 3 to be processed, it is preferred to use a faster transmission interface as the transmission interface 2. For example, a USB 2.0 interface has a transmission rate of about 480 Mb/s, and an IEEE 1394 interface has a transmission rate of about 400 Mb/s. Those are around 40 times the transmission rate of conventional USB 1.1.

Figure 1A:
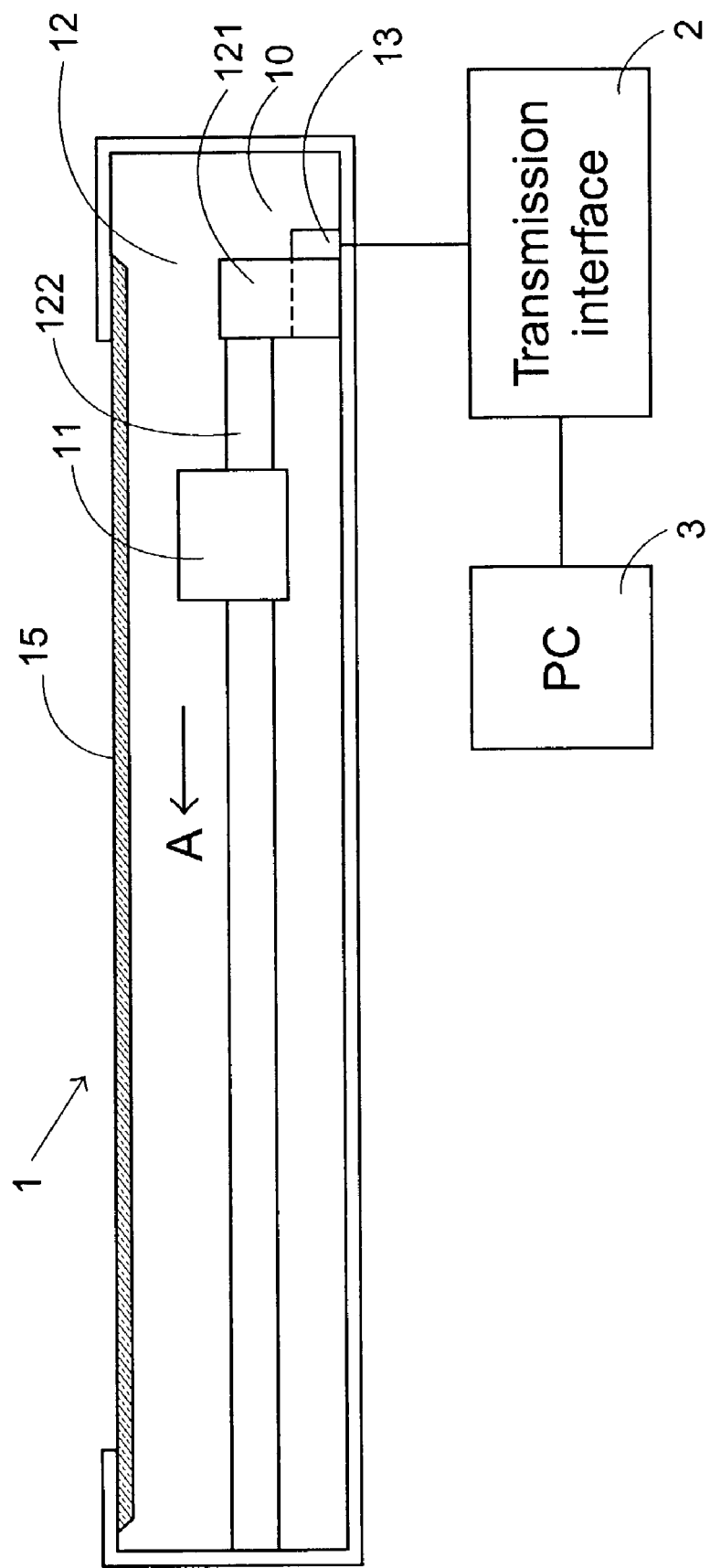
FIG. 1A is a lateral cross-sectional view illustrating a conventional reflective-type image scanner.
Figure 1B:
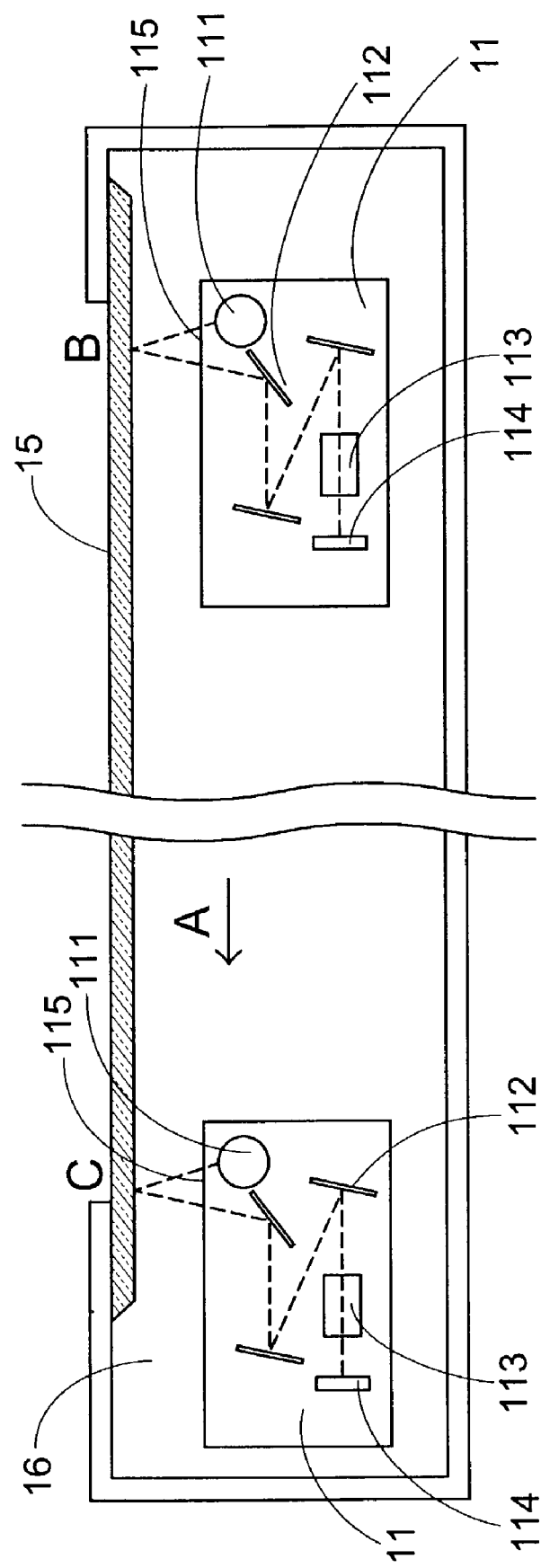
FIG. 1B is a schematic diagram illustrating a carriage module of the conventional reflective-type image scanner in FIG. 1A, wherein a scanning window is located at the front end of a carriage module.
Figure 1C:
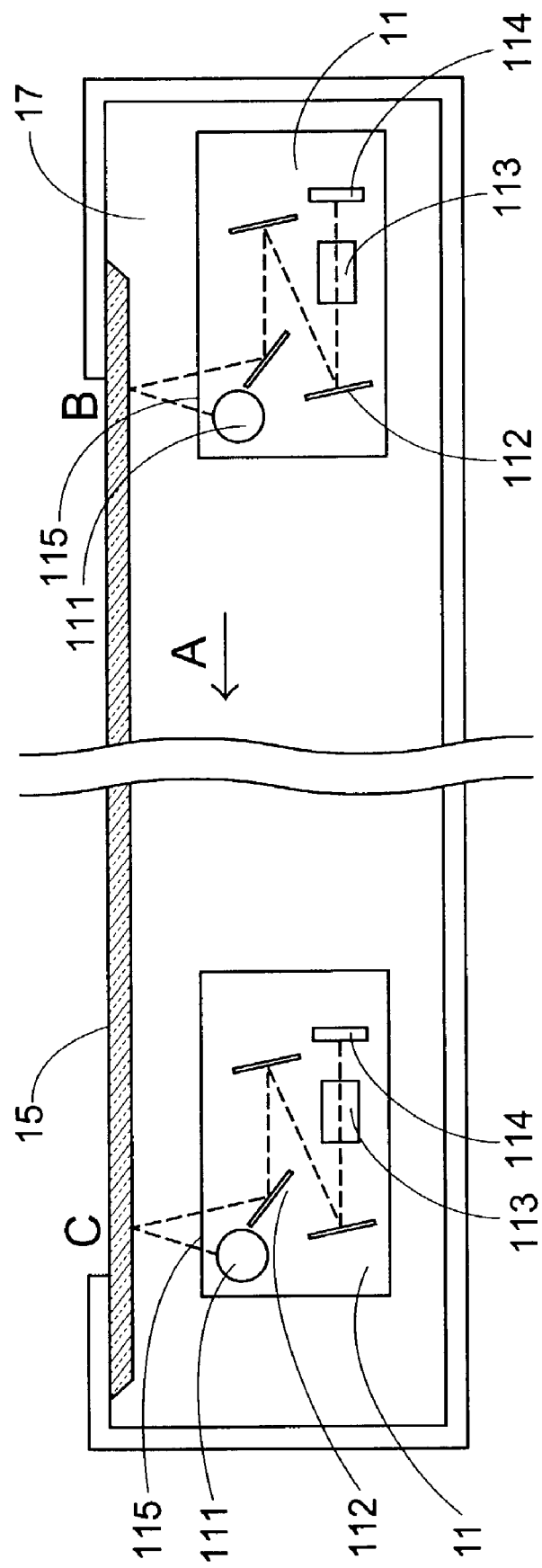
FIG. 1C is a schematic diagram illustrating a carriage module of the conventional reflective scanner in FIG. 1A, wherein a scanning window is located at the rear end of a carriage module.

Please refer to FIG. 3A which is a diagram illustrating the carriage module of the image scanner shown in FIG. 2. For avoiding too complicated figure while describing the optical path clearly, the carriage module 21 is not proportionally enlarged herein and both the scanning platform and the scanned object are merely represented by a straight line 25. The optical devices 211 and 213 disposed in the carriage module 21 include light sources, sets of reflective mirrors and lens, respectively, which are similar to those of FIGS. 1B and 1C. Furthermore, the optical path, the number of the reflective mirrors and the relative positions between those units can be optionally arranged by those who are skilled in the art according to the practical requirements. In addition, the option of the image scanner for processing a reflective or a penetrative scanning operation mentioned in the previous paragraph is dependent on the position of the light source emitting on the scanned object. For example, for reflective-type scanning, the light source emitting on the scanned object is positioned at the same side of the scanned object as the optical device and the CCD. On the contrary, for penetrative-type scanning, the light source is applied to the scanned object from the side opposite to the optical device and the CCD. The operational principles of the reflective and penetrative scanning operations and the functions of the optical devices 211, 213 and the CCD 212, 214 are well known by those skilled in the art, so it is unnecessary to be redundantly described herein. However, it should be noted that the two scanning windows are preferably disposed at the opposite sides of the carriage module 21, so the carriage module 21 only has to move between the front end B and the rear end C of the scanning platform. Hence, it is unnecessary to provide additional space beyond the end B or C for accommodating the optical devices and the CCD, as the prior art does, thereby reducing the area occupied by the image scanner.

Figure 3B:
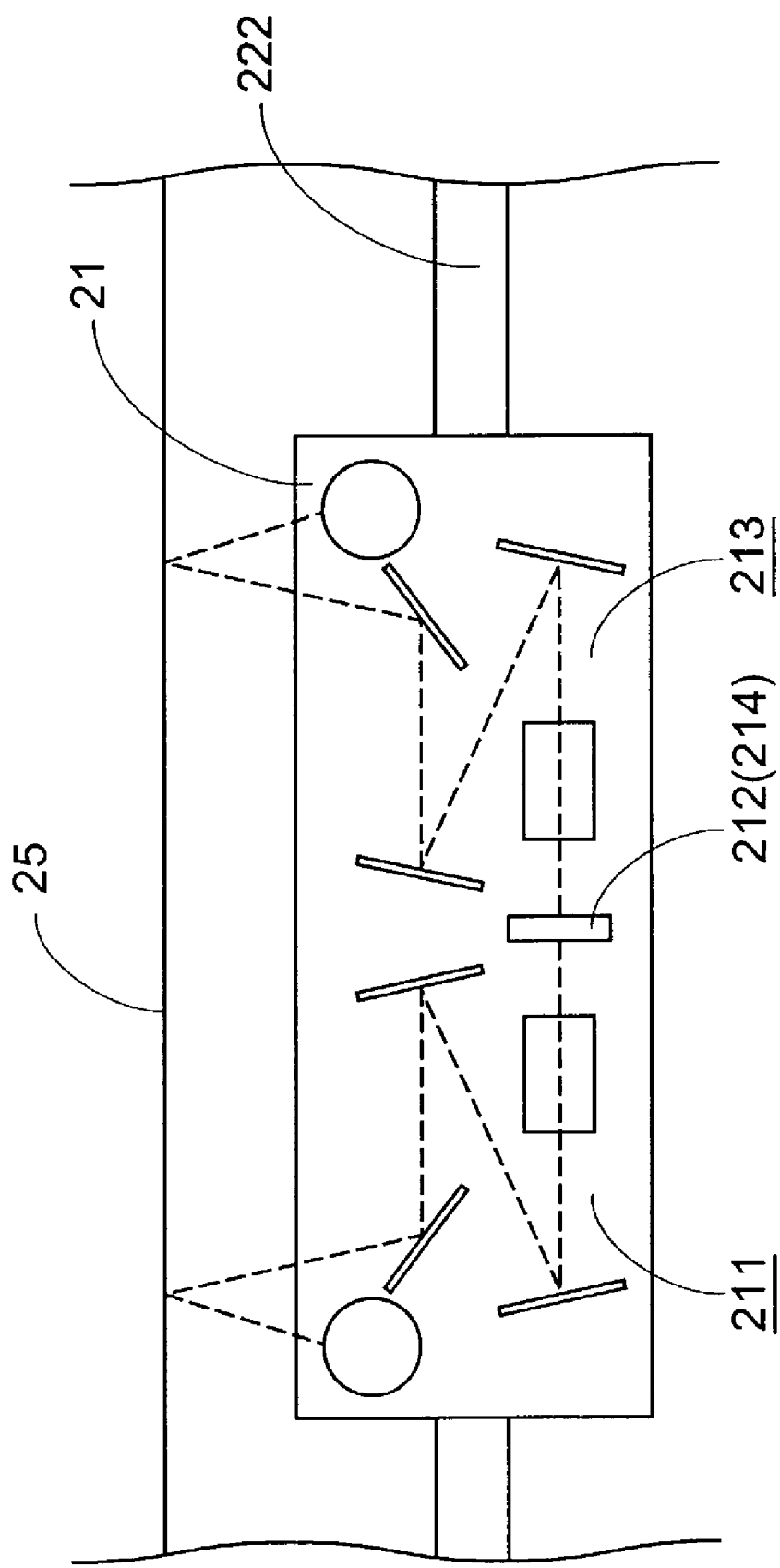
FIG. 3B is a schematic diagram illustrating another preferred embodiment of a carriage module of the image scanner in FIG. 2.

Although the above embodiment employs two sets of optical devices collocating with two CCDs, the optical devices and/or the optical conversion devices can be properly arranged to become one set of CCD as shown in FIG. 3B.

Figure 4:
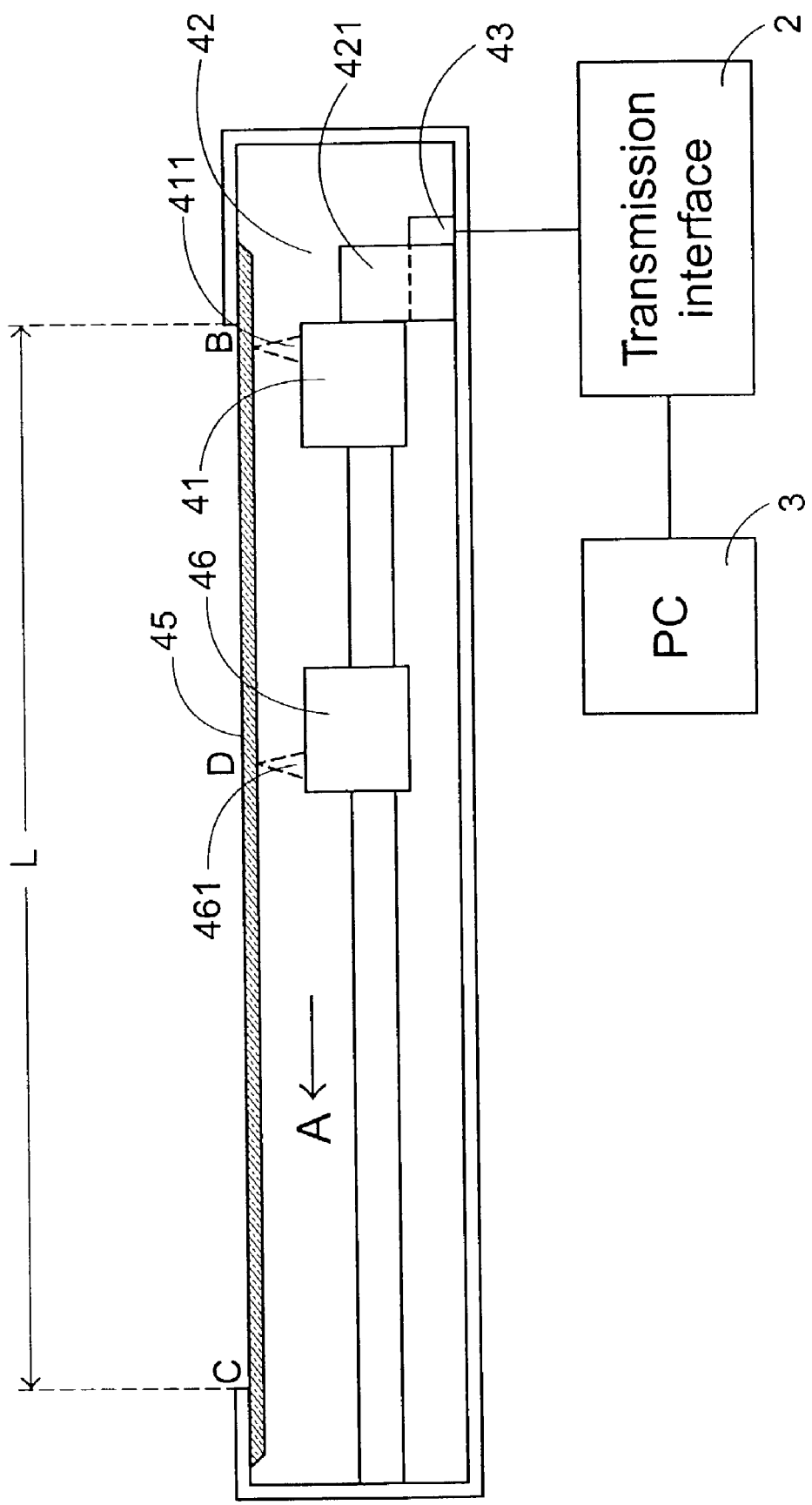
FIG. 4 is a lateral cross-sectional view illustrating another preferred embodiment of an image scanner according to the present invention wherein the image scanner includes two separate carriage modules.
Figure 5A:
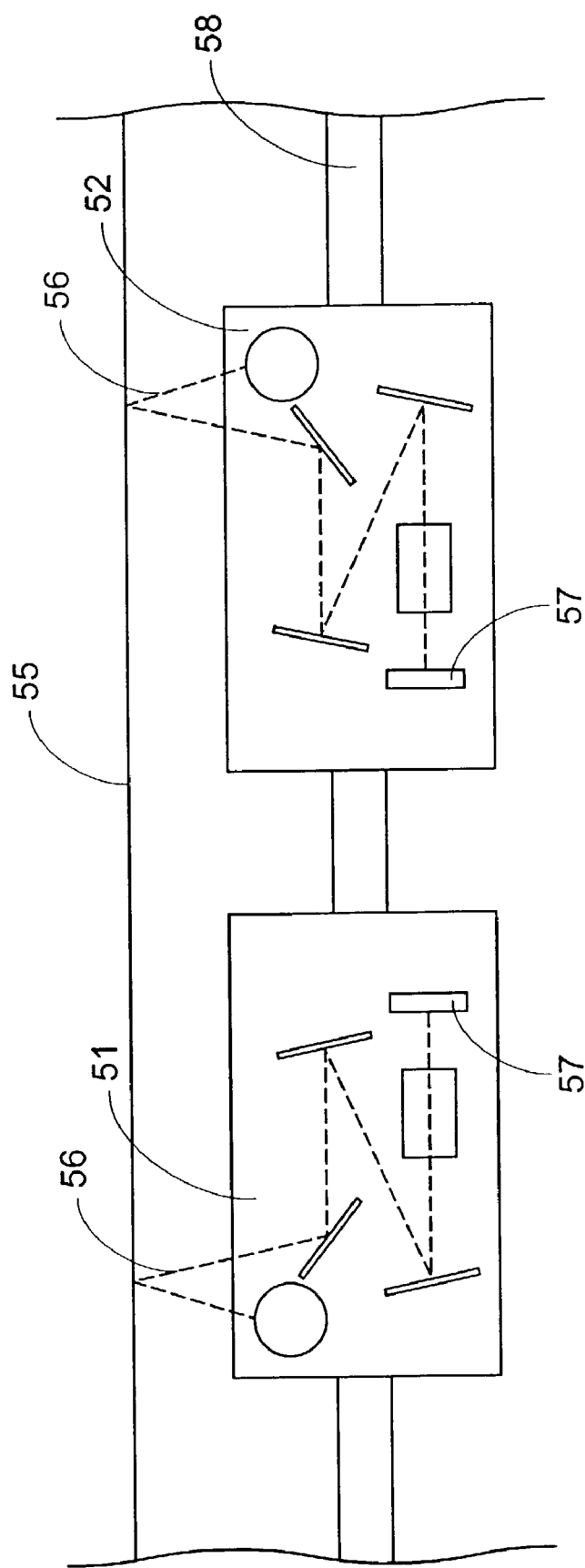
FIG. 5A is a schematic diagram illustrating preferred arrangement of the two carriage modules of the image scanner in FIG. 4.
Figure 5B:
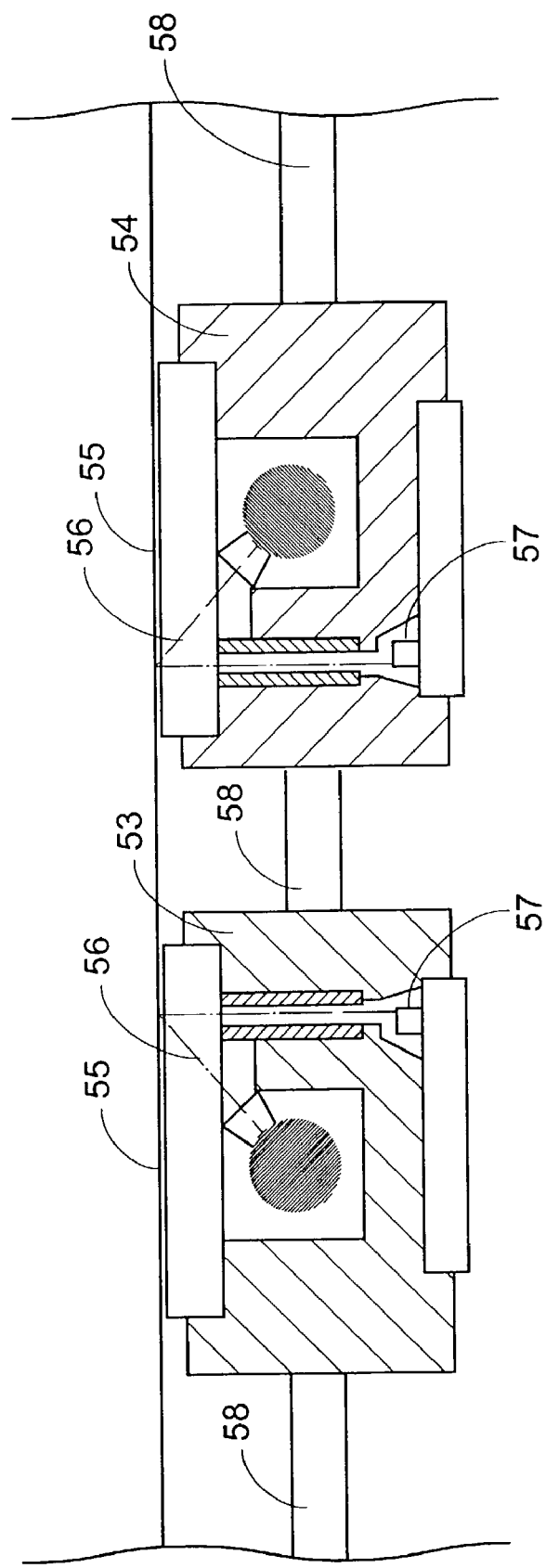
FIG. 5B is a schematic diagram illustrating another preferred arrangement of the two carriage modules of the image scanner in FIG. 4.

Please refer to FIG. 4 which schematically illustrates another preferred embodiment of an image scanner according to the present invention. The image scanner includes a cover (not shown), and a lower housing 40, in which two separated carriage modules 41 and 46, a carriage-driving mechanism 42 and a circuit board 43 are disposed. The operation and function of the carriage-driving mechanism 42 and the circuit board 43 are similar to those of the above embodiment except the two separated carriage modules 41 and 46 are used instead of only one carriage module 21. For this embodiment, these two separated carriage modules 41 and 46 can be charge-coupled device (CCD) or contact image sensor (CIS) carriage modules. The two separated carriage modules 41 and 46 include scanning windows 411 and 461, respectively. Likewise, these two scanning windows 411 and 461 are preferably disposed at distant ends of the two separated carriage modules 41 and 46. The distance between the two scanning windows 411 and 461 is preferably smaller than a half of the scanning platform length L. The diagram showing the optical path of two CCD carriage modules 51 and 52 is shown in FIG. 5A, and that of two CIS carriage modules 53 and 54 is shown in FIG. 5B. The source light 56 of each CCD or CIS carriage module is reflected to a photoelectric conversion device 57, i.e. CCD or CIS, by the scanned object 55, as shown in FIG. 5A or 5B. When scanning, the two separated CCD (51, 52) or CIS (53, 54) carriage modules synchronously move along a track 58 to pass through the scanned object 55 placed on the scanning platform.

To sum up, the present invention provides an image scanner having at least two scanning windows for simultaneously obtaining image data of different portions of the scanned object. The image data obtained via the different scanning windows is then integrated and processed to realize a complete image data of the scanned object. Hence, if supported by a proper transmission interface to quickly integrate and process the data, the image scanner can have a faster scanning speed. In addition, the carriage module only needs to move between the front end B and the rear end C of the scanning platform via properly arranging the relative positions of the scanning windows. For example, one scanning window is disposed at the upstream end in the scanning direction, another is disposed at the downstream end in the scanning direction, and the others are properly disposed therebetween. Therefore, the image scanner does not need extra space beyond the ends B and C for accommodating the optical devices and photoelectric conversion device so the occupied table space can be reduced.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner capable of converting image data of a scanned object into digital image data, comprising:

a scanning platform capable of having placed thereon an object;

a first scanning portion having a first front end and a first rear end, including:

a first image-receiving end moving in a scanning direction to pass under said scanning platform and capable of receiving image data of a first portion of said scanned object, wherein said first image-receiving end is disposed at the first front end of the first scanning portion; and a first photoelectric conversion device synchronously moving with said first image-receiving end and capable of converting said image data of said first portion of said scanned object to a first digital data;

a second scanning portion having a second front end and second rear end, the second front end disposed adjacent to the first rear end, including:

a second image-receiving end moving along said scanning direction and capable of receiving image data of a second portion of said scanned object, wherein said second image-receiving end is disposed at the second rear end of the second scanning portion; and, a second photoelectric conversion device synchronously moving with said second image-receiving end capable of converting said image data of said second portion of said scanned object to a second digital data, wherein said second digital data is combined with said first digital data in order to obtain said digital image data of said scanned object.

2. The image scanner according to claim 1 wherein said first and second scanning portions comprising said first and second image-receiving ends and said first and second photoelectric conversion devices, respectively, are disposed in a single carriage module.

3. The image scanner according to claim 2 wherein said single carriage module comprises a first scanning window and a second scanning window to serve as said first image-receiving end and said second image-receiving end capable of respectively receiving two scanning lines on said scanning platform.

4. An image scanner capable of converting image data of a scanned object into digital image data, comprising:
   a scanning platform capable of having a scanning object placed thereon;
   a first image-receiving end moving in a scanning direction to pass under said scanning platform and capable of receiving image data of a first portion of said scanned object;
   a second image-receiving end disposed downstream of said first image-receiving end by a distance, moving along said scanning direction and capable of receiving image data of a second portion of said scanned object;
   a first photoelectric conversion device synchronously moving with said first image-receiving end and capable of converting said image data of said first portion of said scanned object to a first digital data; and,
   a second photoelectric conversion device synchronously moving with said second image-receiving end and capable of converting said image data of said second portion of said scanned object to a second digital data,
   wherein said second digital data is combined with said first digital data in order to obtain said digital image data of said scanned object,
   wherein said first image-receiving end and said first photoelectric conversion device are disposed in a first carriage module having a first front end and a first rear end, said second image-receiving end and said second photoelectric conversion device are disposed in a second carriage module having a second front end and a second read end, and said first arid second carriage modules respectively have a first and a second scanning window to serve as said first image-receiving end and said second image-receiving end and capable of respectively receiving at least two scanning lines on said scanning platform,
   wherein said first scanning window is disposed at the first front end of said first carriage module and said second scanning window is disposed at the second rear end of the said second carriage module.

5. The image scanner according to claim 4 wherein said first and second carriage modules synchronously move in said scanning direction.

6. The image scanner according to claim 5 further comprising a driving device capable of simultaneously carrying said first and second carriage modules to move in said scanning direction.

7. The image scanner according to claim 1 wherein said distance between said first image-receiving end and said second image-receiving end is approximately half of said scanning platform in length.

8. The image scanner according to claim 1 wherein said first and second photoelectric conversion devices comprise charge-coupled devices (CCD).

9. The image scanner according to claim 1 wherein said first and second photoelectric conversion devices are included in a charge-coupled device (CCD).

10. An image scanner for converting image data of multiple scanning lines of a scanned object into digital data, respectively, comprising:
    a scanning platform for placing a scanned object thereon;
    a carriage case having a plurality of scanning windows respectively corresponding to positions of said multiple scanning lines on said scanning platform when moving in a scanning direction, the carriage case comprising first and second portions synchronously moving in said scanning direction, wherein the first portion has a first front end and a first rear end, and the second portion has a second front end and a second rear end, and wherein at least one scanning window is disposed at the first front end of the first portion, and at least one scanning window is disposed at the second rear end of the second portion; and
    a photoelectric conversion device disposed inside said carriage case moving with said carriage case in said scanning direction and capable of receiving image data of said multiple scanning lines through said plurality of scanning windows, respectively, and converting said image data to digital data.

11. The image scanner according to claim 10 wherein the distance between said two scanning windows is not larger than a half of said scanning platform in length.

12. The image scanner according to claim 10 wherein said carriage case comprises a single case.

13. The image scanner according to claim 10 wherein the distance between said first and second portions is not larger than a half of said scanning platform in length.

14. The image scanner according to claim 10 wherein said photoelectric conversion device comprises a plurality of charge-coupled devices (CCD) capable of respectively receiving said image data of said multiple scanning lines and converting said image data to said digital data.

15. A method for scanning an object on a scanning platform, comprising:
    receiving image data of a first portion of the object through a first scanning window of a first scanning portion of a carriage module moving in a scanning direction, wherein the first scanning portion comprises a first front end and a first rear end, and wherein the first scanning window is disposed at the first front end of the first scanning portion;
    receiving image data of a second portion of the object through a second scanning window of a second scanning portion of the carriage module disposed downstream of the first scanning window, wherein the second scanning portion comprises a second front end and a second rear end, and wherein the second scanning window is disposed at the second rear end of the second scanning portion;
    converting the image data of the first portion of the scanned object to first digital data;
    converting the image data of the second portion of the scanned object to second digital data; and
    combining the first and second digital data to obtain a digital image data of the scanned object.

16. The method of claim 15, further comprising:
positioning the first and second scanning windows at a distance not larger than a half of the scanning platform in length.

17. A method for scanning an object on a scanning platform, comprising:
receiving image data of a first portion of the object through a first scanning window moving in a scanning direction, wherein the first scanning window is disposed at a first front end of a first carriage module having the first front end and a first rear end;
receiving image data of a second portion of the object through a second scanning window disposed downstream of the first scanning window, wherein the second scanning window is disposed at a second rear end of a second carriage module having a second front end and the second rear end;
converting the image data of the first portion of the scanned object to a first digital data;
converting the image data of the second portion of the scanned object to a second digital data; and
combining the first and second digital data to obtain a digital image data of the scanned object.

18. The method of claim 17, further comprising:
positioning the first and second scanning windows at a distance not larger than a half of the scanning platform in length.

* * * * *

UNITED STATES PATENT AND TRADEMARK OFFICE
CERTIFICATE OF CORRECTION

PATENT NO. : 7,289,242 B2
APPLICATION NO. : 10/188935
DATED : October 30, 2007
INVENTOR(S) : Lai It is certified that error appears in the above-identified patent and that said Letters Patent is hereby corrected as shown below:

On the Title Page
Item (74) Attorney, Agent, or Firm, change "law" to --Law--

Column 7
Line 20, change "scanning object" to --scanned object--
Line 47, change "arid" to --and--

Signed and Sealed this

Twenty-seventh Day of October, 2009

David J. Kappos
*Director of the United States Patent and Trademark Office*